Patented July 18, 1944

2,353,978

UNITED STATES PATENT OFFICE 2,353,978

POLISHING AND FOGGING INHIBITING PRODUCT

Harold C. Weber, Milton, Mass.

No Drawing. Application June 25, 1938, Serial No. 215,928

4 Claims. (Cl. 15—209)

This invention relates to a new product which is of particular value for polishing and inhibiting fog and more particularly refers to an impregnated material which will impart a high polish to and retard or prevent the formation of fog on the surface of glass, metal and related objects.

As is well known, considerable inconvenience and hazard is caused by the deposition of fog on eye-glasses, windshields, automobile windows, mirrors, bathroom fixtures, store windows, dental mirrors, sight glasses, and the like. Likewise, appreciable difficulty is occasioned in imparting a pleasing polish to the aforesaid objects and many other objects which are not transparent but upon which a high polish is desirable such as, for example, the polishing of leather, metals, wood, lacquer and related surfaces.

It is an object of this invention to produce articles of considerable utility in retarding or preventing the formation of fog upon the surfaces of polished, transparent and other articles. A further object is to produce in an economical manner products which may be rubbed over the surface whereon a high polish is desired or upon which the formation of fog is to be avoided, thereby accomplishing these desirable objectives. A still further object is to produce articles which are of considerable utility in that by rubbing them over any given surface they deposit upon this surface a thin film which retards or prevents the formation of fog thereon and/or which imparts thereto a high polish. Additional objects will become apparent from a consideration of the following description and claims.

These objects are attained in accordance with the present invention wherein a fibrous material is impregnated with a surface active substance containing at least six carbon atoms. In a more restricted form this invention is directed to products which are produced by impregnating a non-linting fibrous material with a surface active substance containing an aliphatic hydrocarbon radical of at least six carbon atoms. In its preferred embodiment this invention is concerned with an absorbent non-linting textile material which is impregnated with a surface active substance containing a sulfated aliphatic hydrocarbon radical of from twelve to eighteen carbon atoms. Where a high polish is desired a natural or synthetic wax may be incorporated with the aforesaid surface active agent or agents.

The invention may be more readily understood by a consideration of the following illustrative examples:

Example 1

A common double napped flannel of from one to five yards per pound is passed through an aqueous solution of 2-8-diethyl-tridecanol-6-sodium sulfate so that the resulting dried product contains about two ounces of the aforesaid surface active material per square yard. The dried product may then be rubbed over mirrors, windows, wind-shields, eye-glasses, and the like. After this treatment the formation of fog on these articles is prevented for a period of several hours or days, depending upon the use which is made of the article. For example, when this cloth is rubbed over a bathroom mirror it will not fog for a period of several days. On the other hand, when it is rubbed over a wind-shield which is exposed to the atmosphere it may be necessary to repeat the operation after a period of several hours, depending upon the weather conditions. In the meantime, the formation of fog thereon is successfully and satisfactorily prevented without lowering the transparency or natural appearance of the article.

Satisfactory results were obtained by substituting in the above example products sold under the trade names of "Tergitol," "Aerosol" and "Igepon."

Example 2

The above example was repeated using as a surface active substance the reaction product of a mixture of higher fatty acids with amino-ethane-sulfonic acid or hydroxy-ethane-sulfonic acid. The resulting product was found to be quite satisfactory for retarding or preventing the deposition of fog on glass.

Example 3

Example 1 was repeated using the products produced by reacting higher fatty alcohols with a sulfo-acetate. The products were found to have the desirable properties referred to in the preceding examples.

Example 4

An aqueous emulsion of wax was produced by treating wax with an aqueous solution of the surface active agent referred to in Example 1. An absorbent flannel cloth is passed through this emulsion and dried, leaving on the cloth a deposit of the wax with the surface active agent. This cloth imparted a high polish to leather, metal, wood, lacquered and varnished surfaces and related articles.

It is to be understood that the aforesaid examples are illustrative merely of a few practical methods of carrying out the present invention. They may be varied widely with respect to the particular reagents used, the type of fibrous material impregnated with these reagents, the manner of impregnating said material and the proportion of reagents without departing from the scope hereof.

For example, in place of a flannel cloth it is contemplated that other fibrous material may be used, such as woven or knitted fabrics, or merely conglomerate masses of fibers composed of cotton, linen, wool, rayon, and the like. In the same manner, fibrous material which is not susceptible of weaving, knitting, etc., may be used, such as those materials produced in the paper industry. These fibrous materials are preferably absorbent and non-linting, this latter feature being of value when it is desired to prevent the deposition of lint on those surfaces over which the final products are rubbed. For optimum results over a wide range of conditions it is to be understood that the preferred embodiment of this invention involves the use of an absorbent, non-linting, woven, cotton material.

The surface active agents which are contemplated for use herein are exceedingly numerous in number and are well known in the art. These agents should contain at least six carbon atoms, and in particular should contain an aliphatic hydrocarbon radical of at least six and preferably from twelve to eighteen carbon atoms. Likewise, these agents should be of such nature that they are readily soluble in water containing calcium and magnesium salts. Surface active agents which are representative of the aforesaid category are, for example, sulfonated petroleum hydrocarbons, sulfated higher aliphatic alcohols, the reaction products of higher fatty acids with alkylene sulfonic acids, the reaction products of higher fatty alcohols with sulfo-acetates, the reaction products of higher fatty acids and sulfuric or chlorsulfonic acid with polyhydric alcohols such as glycol and glycerine, alkylated naphthaline sulfonic acids, alkylated phenol sulfonic acids, and the like. Among the products coming within this category and herein contemplated for use are those sold under the trade names of "Tergitol" (#7 being prefered), "Aerosol," and "Igepon." As is well known, the aforesaid products which are designated by their trade names as well as practically all surface active agents which contain an acid group are sold commercially in the form of their salts, generally their sodium salts.

Among the waxes which may be used in accordance with the preceding instructions, particularly where the resulting impregnated products are desired for polishing purposes, are paraffin wax, beeswax, carnauba wax, montan wax, etc. These waxes may be used alone or in admixture with one another, as in the case of the surface active agents just referred to, and they may be substituted by other well known natural or synthetic waxes or compounds of a wax-like nature.

The fibrous materials previously referred to and the many others suggested thereby may be impregnated with the surface active agents and/or with the waxes or wax-like materials by passing them through solutions or suspensions of the same. For example, where the impregnated products are desired primarily for their fog retarding or fog preventing properties the fibrous material may be passed through an aqueous solution of one or more of the aforesaid surface active agents or the many other agents suggested thereby and having similar properties, and thereafter dried to produce the desired impregnated material. The solutions may be dilute or concentrated as, for example, solutions wherein the concentration of surface active agent is from about 10% to about 80%. The concentration of the surface active agents will depend largely upon the particular type of agents, the particular type of fibrous material to be impregnated, as well as the particular use of the resulting products. As a general rule, it may be stated that the resulting impregnated material should contain in the neighborhood of about one to about three ounces of surface active agent per square yard of material. However, it is to be understood that a greater or lower concentration of these agents is possible without departing from the scope of this invention.

It is contemplated that the aforesaid and related surface active agents may be imparted to the fibrous material in admixture with waxes or wax-like materials. The presence of wax or wax-like materials is particularly desirable where these products are to be used for imparting a high polish or luster to articles such as leather shoes, furniutre, lacquered and varnished surfaces, wood, metal, etc. As in the case of the surface active agents, the amount of waxes used will depend to a large extent upon the particular wax or wax-like material selected, the fibrous material which is to be impregnated, the surface active agent or agents which are used in admixture therewith, and the purposes of the resulting impregnated product. As a general rule, it may be stated that where these products are to be used primarily for polishing purposes they should be impregnated with sufficient wax to give them a clearly visible coating of such products. In this connection, an amount of wax varying from aobut one-half ounce to more than eight ounces per square yard of the impregnated material has been found to be quite satisfactory.

When the fibrous materials are to be impregnated with wax or wax-like materials it is to be understood that this may also be accomplished from a solution or dispersion of such materials. For example, an aqueous emulsion of the wax or wax-like material may be prepared with the aid of the surface active agents previously referred to herein. The fibrous material to be impregnated is then passed through this solution or dispersion and dried. Another illustrative manner of accomplishing this impregnation is to dissolve the wax in an organic solvent or to suspend it in organic vehicles. The cloth is then passed through such solutions or suspensions and dried as aforesaid.

The resulting products may be cut in such sizes or shapes as will facilitate their practical use in polishing and/or inhibiting fog on the numerous articles wherein such results are desired. Where the product is to be used primarily for its fog inhibiting properties it may be cut into large squares or rectangles and these pieces may be folded several times in order to produce an article of convenient size. In the same manner, where the products are to be used for polishing shoes, wood, metal, varnished, lacquered, etc., articles they may be cut into squares or rectangles of convenient size and they may be used either as material having a single layer or a multiplicity of layers.

By means of the present invention articles having appreciable value for polishing and for retarding and preventing fog may be made. These articles are simple and inexpensive to make and are of pronounced value for the aforesaid purposes. The products are so prepared that they may be used with a minimum of inconvenience, such as by merely rubbing over the surface of the article to be polished or on which fog is undesirable. Such surfaces need not be otherwise treated although, in general, it is contemplated that they should be clean and should have present thereon a small amount of moisture.

As many apparently widely different embodiments of this invention may be made without departing from the spirit and scope thereof, it is to be understood that the invention is not limited to the specific embodiments thereof except as defined in the appended claims.

I claim:

1. An improved polishing and fog-inhibiting article, which is substantially dry to the touch, consisting of a non-linting textile material impregnated with a neutralized sulfated aliphatic hydrocarbon derivative containing from twelve to eighteen carbon atoms, said impregnating composition being substantially free from compounds other than the aforesaid hydrocarbon derivatives.

2. An improved polishing and fog-inhibiting article, which is substantially dry to the touch, consisting of a non-linting textile material impregnated with a neutralized sulfated aliphatic alcohol containing from twelve to eighteen carbon atoms, said impregnating composition being substantially free from compounds other than the aforesaid hydrocarbon derivatives.

3. An improved polishing and fog-inhibiting article, which is substantially dry to the touch, consisting of a non-linting cotton textile material impregnated with 2-8-diethyl-tridecanol-6-sodium sulfate, said impregnating composition being substantially free from compounds other than the aforesaid hydrocarbon derivatives.

4. An improved fog-inhibiting article consisting of a substantially non-linting, porous, fibrous material impregnated with a fog-inhibiting agent the principal active ingredient of which is a non-oily neutralized sulfated aliphatic hydrocarbon derivative containing at least twelve carbon atoms, the calcium and magnesium salts of which are readily soluble in water.

HAROLD C. WEBER.